Feb. 18, 1936.  T. DODGE  2,031,146
AUTOMATIC WATERING DEVICE
Filed Aug. 16, 1935   2 Sheets-Sheet 1
Fig. 1.
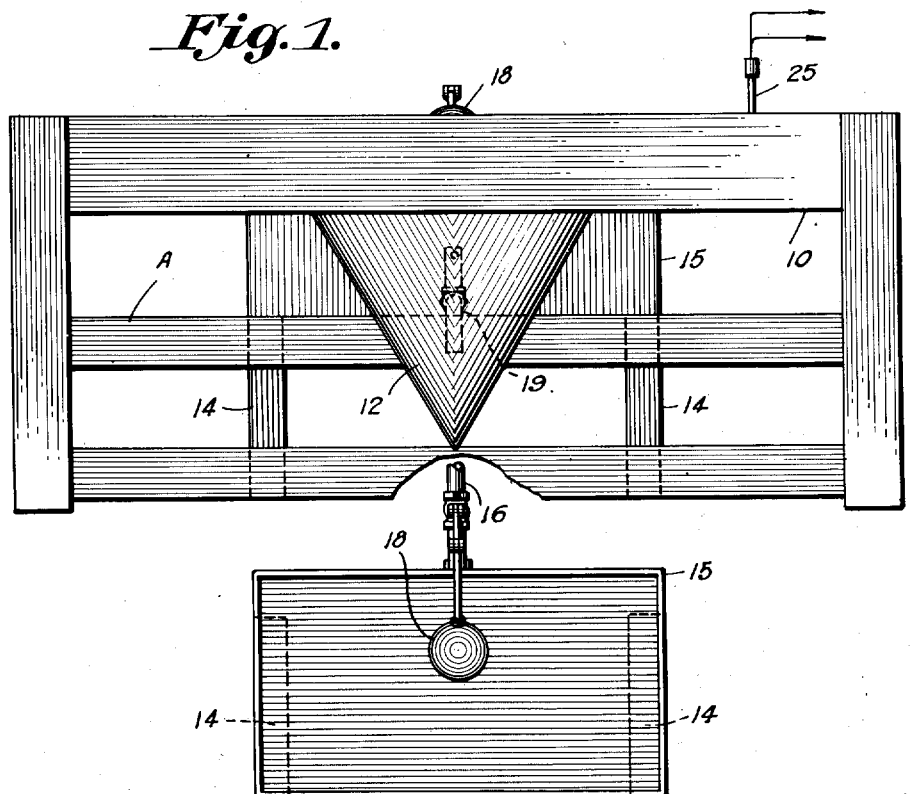
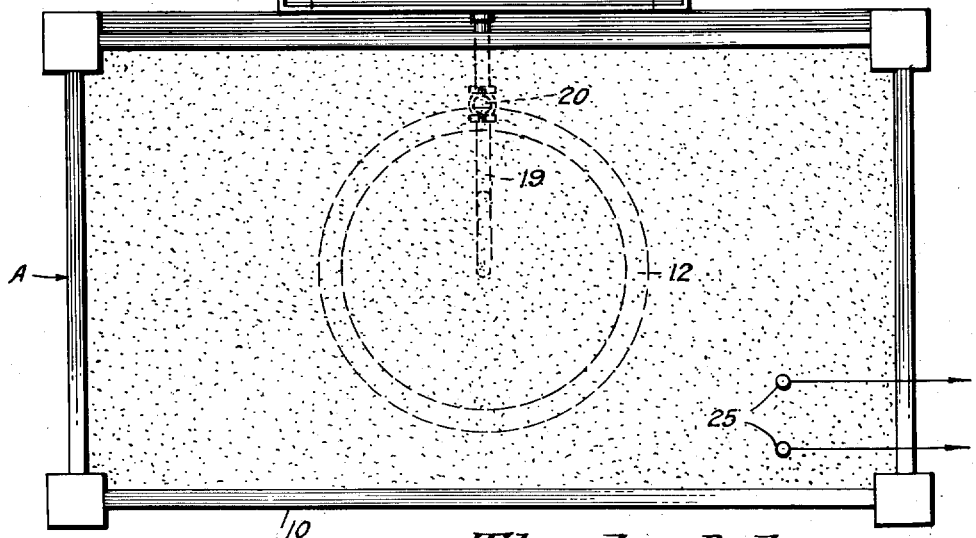
Fig. 2.
Theodore Dodge, INVENTOR
BY Victor J. Evans & Co.
ATTORNEY

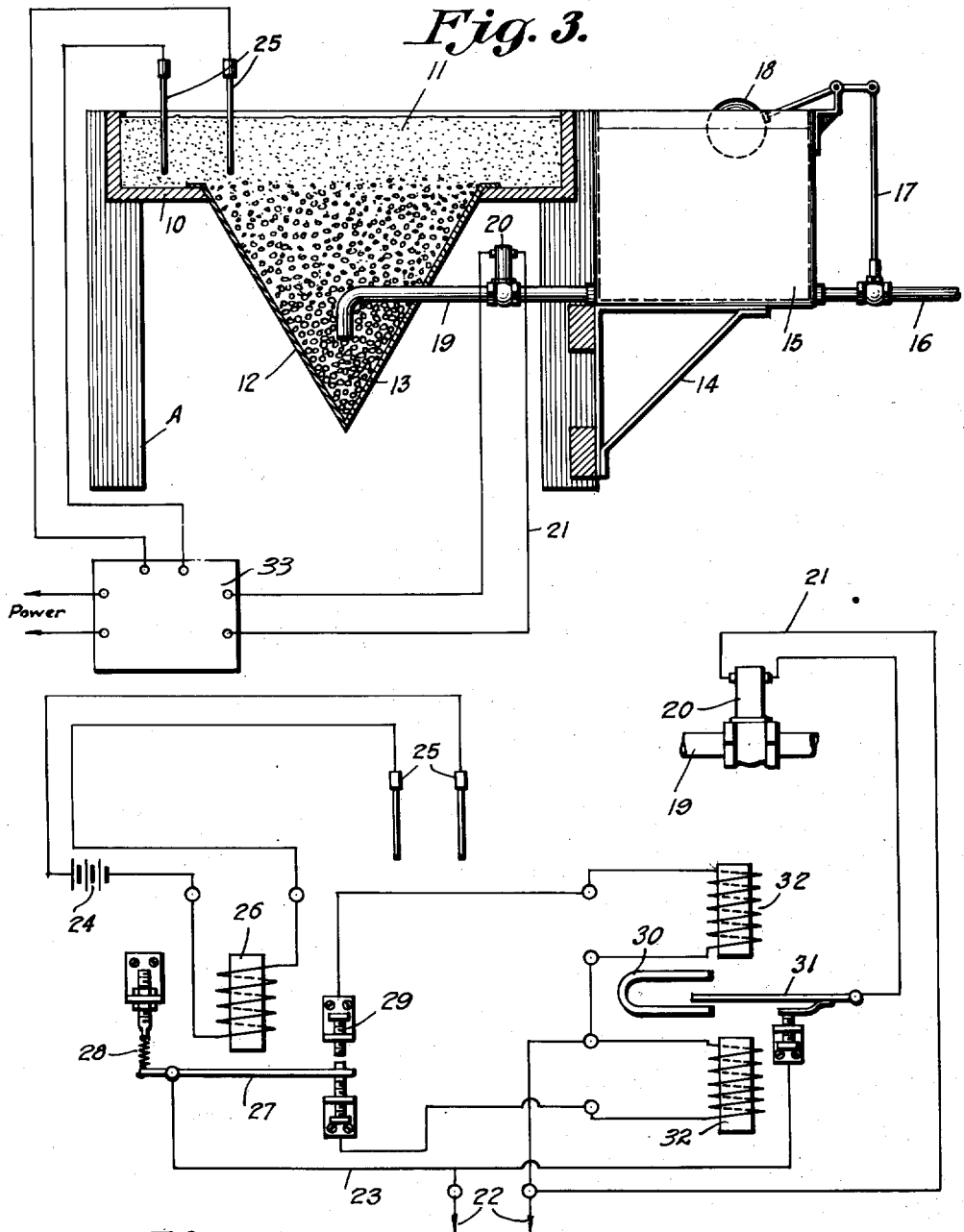

Patented Feb. 18, 1936

2,031,146

UNITED STATES PATENT OFFICE 2,031,146

AUTOMATIC WATERING DEVICE

Theodore Dodge, River Falls, Wis.

Application August 16, 1935, Serial No. 36,588

3 Claims. (Cl. 47—38)

The invention relates to a watering device and more especially to an automatic watering device.

The primary object of the invention is the provision of a device of this character, wherein the same is susceptible for use in a greenhouse, lawns, golf greens, gardens or other localities where it is required to furnish moisture to the soil for maintaining it in a healthy condition and by which water will be supplied at the required intervals to the soil, the supply of water being automatically controlled to avoid excess flow during the use of the device.

Another object of the invention is the provision of a device of this character, wherein the valve for controlling the water feed is operated automatically through electric control mechanism so that hand watering is entirely eliminated.

A further object of the invention is the provision of a device of this character, wherein irrigation of soil can be had without requiring manual labor and such soil maintained in a moist condition without waste of water as the feed of the water is automatically controlled.

A further object of the invention is the provision of a device of this character which is comparatively simple in its construction, thoroughly reliable and efficient in its operation, automatic in action and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is an elevation of the device constructed in accordance with the invention.

Figure 2 is a top plan view thereof.

Figure 3 is a vertical transverse sectional view showing diagrammatically the electric circuit arrangement for the control of the feed of water.

Figure 4 is a diagrammatic plan view of the electric control mechanism employed with the device.

Similar reference characters indicate corresponding parts throughout the several views in the drawings.

Referring to the drawings in detail, there is disclosed a specially prepared greenhouse bench with which the watering device constituting the present invention is associated and this bench involves a suitable stand A having built in its top a trough or tray 10 which may be of the required size and of the desired shape for accommodating top soil 11, the bottom of the trough or tray 10 being fitted with an inverted cone 12 constituting a hopper in which is placed gravel 13, the quantity being preferably made up of large and small gravel and the larger gravel being lowermost while the finer or smaller gravel is uppermost to facilitate the flow of water let into the hopper 12 so that by capillary attraction the water therein will be taken up by the top soil 11 throughout the extent of the same and this top soil is for the growing of young plants or the raising of such plants from seeds.

At one side of the stand A and fastened thereto in any suitable manner are brackets 14 for supporting a water reservoir or tank 15 with which communicates a feed conduit or pipe 16 having a float controlled valve mechanism 17 so that the water within the reservoir or tank 15 will be maintained at a constant level. The float 18 of the mechanism 17 is suitably arranged within the tank to be acted upon by the water for regulating the level thereof.

Leading from the reservoir or tank 15 is a delivery spout 19 which opens into the hopper 12 and within the spout is arranged an electrically controlled normally opened valve mechanism 20 included in a heavy duty circuit 21 connected with a power supply line 22 and associated with a high resistance circuit 23 having the separate source of current supply 24 and the soil electrodes 25, these being extended into the top soil 11 as is clearly shown in Figure 3 of the drawings.

In the operation of the watering device assuming the soil 11 to be dry at the start, the cycle of operation, is that water flows from the reservoir or tank 15 because the valve in the spout 19 is normally open for deposit in the hopper 12 so that the gravel 13 therein will become saturated and by capillary attraction the soil 11 for a greater extent of its depth will become moist with the water and when such soil has become damp sufficiently to decrease the electric resistance between the non-corrosive electrodes 25 the electric circuit 23 will operate which in turn effects the operation of the circuit 21, the latter actuating the valve in the spout 19 to automatically close the same and thus shutting off the water supply to the hopper 12 until the moisture content of the soil has decreased sufficiently thus increasing the resistance of said soil to again operate the circuit 23 which involves the electro-magnet 26 associated with an armature 27 having the adjustable spring tensioner 28 and this armature operates between the contacts 29 in the circuit 21 which latter has the substantially horseshoe shaped permanent magnet 30 cooperating with the armature 31 between the electro-magnets 32. This horseshoe magnet 30 is adapted to hold the armature 31 in either position when attracted by the electro-magnets 32 and still not hold the same beyond the strength of such magnet. These circuits 21 and 23 are disclosed in detail in Figure 4 of the drawings and the connection of the ground electrodes 25 with the circuit 23 is disclosed in this view and also in Figure 3 while the connection of the valve in the spout 19 is also disclosed thereby.

It is to be understood that the invention is not restricted in its use to the structure as before disclosed because such device is applicable to lawns, golf greens, gardens or other soil areas and such device is automatic in its operation for water control.

The electrical equipment including the magnets and armatures and other adjuncts is within a housing 33 suitably supported.

What is claimed is:

1. The combination of a container for soil, supply means for moistening soil within the container, means for controlling the supply means, and electric control means for the second-named means and rendered active upon moistening the soil within the container.

2. The combination of a container for soil, supply means for moistening soil within the container, means for controlling the supply means, electric control means for the second-named means and rendered active upon moistening the soil within the container, and a storage tank for the supply means.

3. The combination of a container for soil, supply means for moistening soil within the container, means for controlling the supply means, electric control means for the second-named means and rendered active upon moistening the soil within the container, a storage tank for the supply means, and a substance within the container for setting up capillary attraction of moisture therein to the soil.

THEODORE DODGE.